US012809831B2

(12) United States Patent
Gugnani et al.

(10) Patent No.: US 12,809,831 B2
(45) Date of Patent: Nov. 24, 2026

(54) AUTOMATED MIGRATION FROM A DOCUMENT DATABASE TO A RELATIONAL DATABASE

(71) Applicant: Oracle International Corporation, Redwood Shores, CA (US)

(72) Inventors: Shashank Gugnani, Foster City, CA (US); Ajit Mylavarapu, Mountain View, CA (US); Sukhada Pendse, Foster City, CA (US); Tirthankar Lahiri, Palo Alto, CA (US); Shadab Ahmed, Delhi (IN); Sanju Gowda, Sunnyvale, CA (US); Beda C. Hammerschmidt, Palo Alto, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 155 days.

(21) Appl. No.: 18/420,708

(22) Filed: Jan. 23, 2024

(65) Prior Publication Data

US 2025/0147936 A1 May 8, 2025

Related U.S. Application Data

(60) Provisional application No. 63/547,353, filed on Nov. 4, 2023.

(51) Int. Cl.
*G06F 7/02* (2006.01)
*G06F 16/00* (2019.01)
(Continued)

(52) U.S. Cl.
CPC ........ *G06F 16/214* (2019.01); *G06F 16/2365* (2019.01); *G06F 16/258* (2019.01); *G06F 16/288* (2019.01); *G06F 16/93* (2019.01)

(58) Field of Classification Search
CPC ...... G06F 16/214; G06F 16/93; G06F 16/258; G06F 16/288; G06F 16/2365
See application file for complete search history.

(56) References Cited

U.S. PATENT DOCUMENTS

| | | | | |
|---|---|---|---|---|
| 10,061,787 | B2 * | 8/2018 | Wang | G06N 5/04 |
| 2006/0173865 | A1 * | 8/2006 | Fong | G06F 40/151 |

(Continued)

OTHER PUBLICATIONS

Pokorny, Jaroslav, "Integration of Relational and NoSQL Databases," Vietnam Journal of Computer Science, vol. 6 #4, 2019. (Year: 2019).*

(Continued)

*Primary Examiner* — Bruce M Moser
(74) *Attorney, Agent, or Firm* — Hickman Becker Bingham Ledesma LLP

(57) ABSTRACT

Techniques for automatically migrating documents from a document database to a relational database are provided. In one technique, it is determined whether a set of documents, from a document database system, can be stored in a relational database system. If so, one or more entities to be normalized are identified based on a hierarchical structure of the set of documents. One or more scripts are generated based on the identified one or more entities. In a related technique, a set of documents from a document database system is stored. It is validated that the set of documents can be converted to one or more duality views. Data of the set of documents is normalized for storing in a relational database system. A script is generated that, when executed, generates the one or more duality views.

20 Claims, 12 Drawing Sheets

(51) Int. Cl.

| | |
|---|---|
| ***G06F 16/21*** | (2019.01) |
| ***G06F 16/23*** | (2019.01) |
| ***G06F 16/25*** | (2019.01) |
| ***G06F 16/28*** | (2019.01) |
| ***G06F 16/93*** | (2019.01) |

(56) References Cited

U.S. PATENT DOCUMENTS

| | | | | |
|---|---|---|---|---|
| 2011/0289118 | A1* | 11/2011 | Chen | G06F 16/86<br>707/E17.054 |
| 2014/0021615 | A1* | 1/2014 | Ryan | H10P 14/40<br>438/653 |
| 2017/0308606 | A1* | 10/2017 | Jonsson | G06F 16/258 |
| 2023/0385308 | A1* | 11/2023 | Senturk | G06F 16/245 |

OTHER PUBLICATIONS

Roijackers, J.A.M., "Bridging SQL and NoSQL," Eindhoven University of Technology, 2012. (Year: 2012).*

Karlsson, Magnus, "XML to RDBMS", Stockholm, Sep. 2000, 56 pages, Retrieved from the Internet: URL:https://www.diva-portal.org/smash/get/diva2:516929/FULLTEXT01.pdf.

* cited by examiner

AUTOMATED MIGRATION FROM A DOCUMENT DATABASE TO A RELATIONAL DATABASE

BENEFIT CLAIM

This application claims the under 35 U.S.C. § 119(e) of provisional application 63/547,353, filed Nov. 4, 2023, by Ajit Mylavarapu et al., the entire contents of which is hereby incorporated by reference.

TECHNICAL FIELD

The present disclosure relates to databases and, more particularly, to document migration from one type of database to another type of database.

BACKGROUND

Document databases are popular with developers because such databases make it easy to retrieve and store hierarchically-organized data corresponding to app-tier language objects. For example, documents, such as JSON documents, are a developer-friendly data access format that provide a flexible schema. The JSON document model avoids the need for decomposition or reconstitution and complexities that come with decomposition/reconstitution. A disadvantage of document databases is that they have significant limitations as a data storage format, especially as the complexity of an application that accesses a document database increases.

A new feature in database technology, referred to as "duality views", allows data to be stored in relational tables and accessed as JSON documents. In this way, the new feature combines the benefits of relational and document worlds while avoiding their respective pitfalls. This new feature provides flexibility and simplicity for database developers. For this new feature to be successful, there should be an easy mechanism for users to migrate their data and applications from document databases to relational databases.

However, there are several challenges in supporting such a mechanism. For example, duality views are declarative. In other words, users must define their relational schema and declare tables and duality views over this schema. Not only is this defining difficult in general, developers using document databases may be unfamiliar with relational concepts and declarative programming. It is not trivial for such developers to figure out the optimal schema and view definitions for their respective data. Additionally, it is difficult for such developers to seamlessly migrate their respective applications and data to relational databases.

Current approaches to migrating data from a document database to a relational database involve several manual steps that are non-trivial, time-consuming, and oft times frustrating.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION OF THE DRAWINGS

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for automatically migrating documents from a document database to a relational database are provided. In one technique, a three-stage process is implemented to ensure a successful migration: (1) validating that document collections can be converted to duality views, (2) normalizing document collections to relational tables, and (3) generating scripts that, when executed, create tables, indexes, and/or duality views.

Embodiments improve computer-related technology involving migrating documents from one type of database to another type. Embodiments are automatic, fast, and hide a lot of complexity regarding relational databases from developers. Once a document is migrated to a relational database, users gain benefits of relational databases, such as normalization, ACID properties, and security features. While embodiments automate the most difficult and time-consuming steps in the migration process from document databases to relational databases with duality views, additional embodiments allow for users to make changes to an automatically-generated schema or entity-relationship model before the relational tables and duality views are created. In summary, embodiments significantly reduce the barrier for application developers to migrate documents from document databases to relational databases.

System Overview

Figure 1:
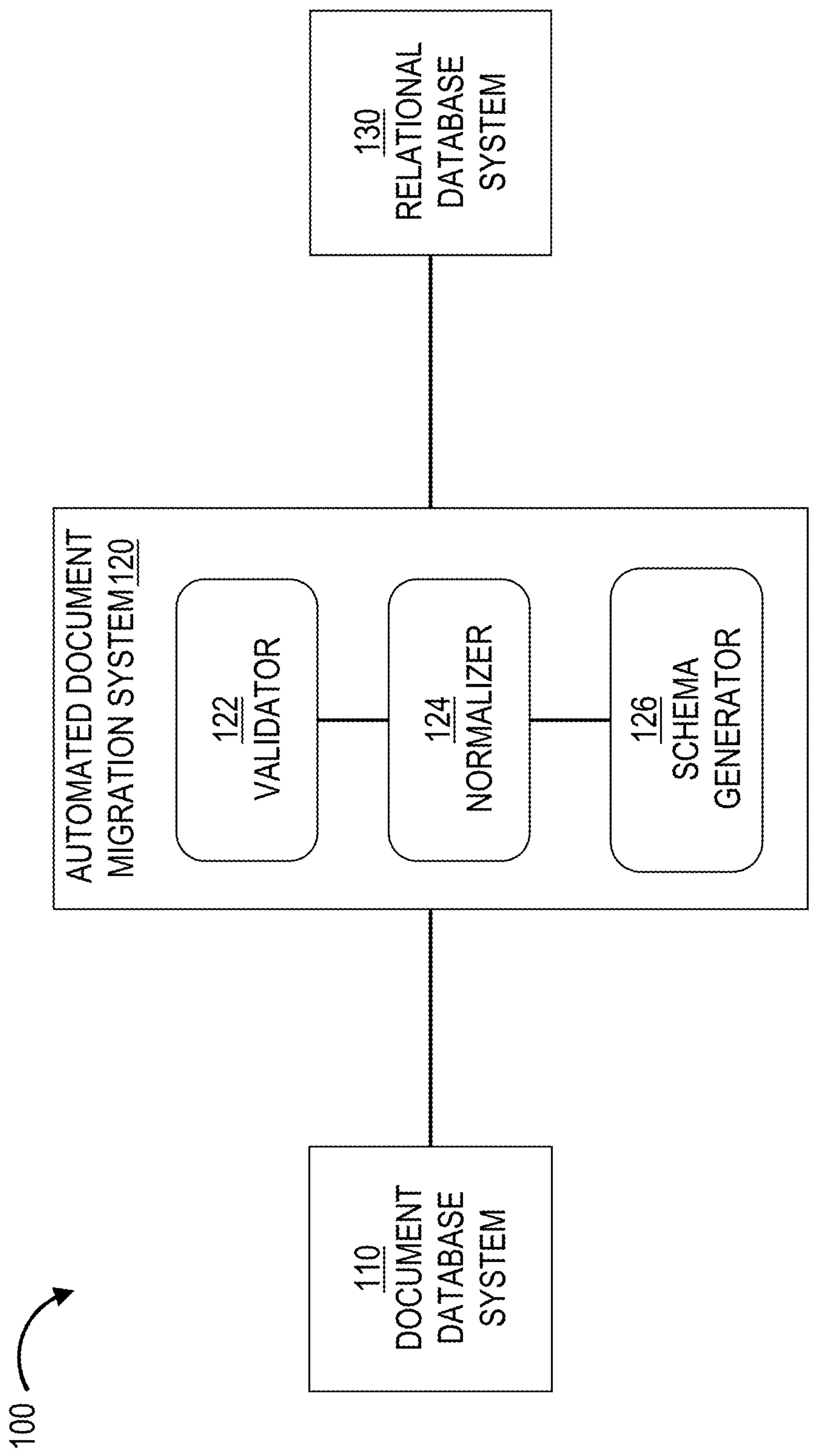
FIG. 1 is a flow diagram that depicts an example system architecture, in an embodiment.

FIG. 1 is a flow diagram that depicts an example system architecture 100, in an embodiment. System architecture 100 includes a document database (DDB) system 110, an automated document migration (ADM) system 120, and a relational database (RDB) system 130. ADM system 120 includes a validator 122, a normalizer 124, and a schema generator 126. Each of validator 122, normalizer 124, and schema generator 126 may be implemented in software, hardware, or any combination of software and hardware. While the forgoing description indicates that validator 122, normalizer 124, and schema generator 126 perform specific tasks or operations, ADM system 120 may performs those tasks/operations with more or less components or with the same components performing a different combination of those tasks/operations.

DDB system 110 exports (or sends) one or more document collections to ADM system 120. An example of DDB system 110 is Mongo DB. A document collection may involve one or more sets of documents. Each set of documents may be exported in a single transmission over a single network connection. If there are multiple sets of documents, then each set of documents may be exported in different transmissions over a single network connection or over different network connections. Thus, DDB system 110 may be communicatively coupled to ADM system 120 over one or more computer networks, such as a local area network (LAN), a wide area network (WAN), or the Internet. Similarly, RDB system 130 may be communicatively coupled to ADM system 120 over one or more similar computer networks.

A document collection may include documents of the same format or documents of different formats. (A document format refers to the number of elements in a document, how the elements are organized in the document, and/or the data types of those elements.) For example, one document collection may include one or more documents that include employee data records that are formatted in a particular manner and another document collection may include one or more documents that include department data records that are formatted in a different manner. As another example, a single document collection may include a document comprising employee data records and a document comprising department data records.

Overview of Automated Document Migration System

ADM system 120 receives a document collection (from DDB system 110) and performs operations with respect to documents in the document collection. Those operations correspond to the operations performed by components of ADM system 120, such as validation, normalization, and schema generation. Generally, ADM system 120 validates (or determines) whether a document collection can be converted to a relational format and a duality view, normalizes the document collection to relational tables (including deduplication of data), and generates database language (e.g., SQL) scripts to create tables, indexes, and/or duality views. Thus, ADM system 120 performs the most difficult tasks of the document migration process. The primary task of a user of ADM system 120 is to specify a document collection location, such as providing, to ADM system 120, input that specifies a storage location (physical or logical) where a document collection (or a subset thereof) is stored. In response, ADM system 120 either performs the migration or generates and presents, to the user, a script for generating one or more database objects that store relational data originating from the document collection.

Figure 2:
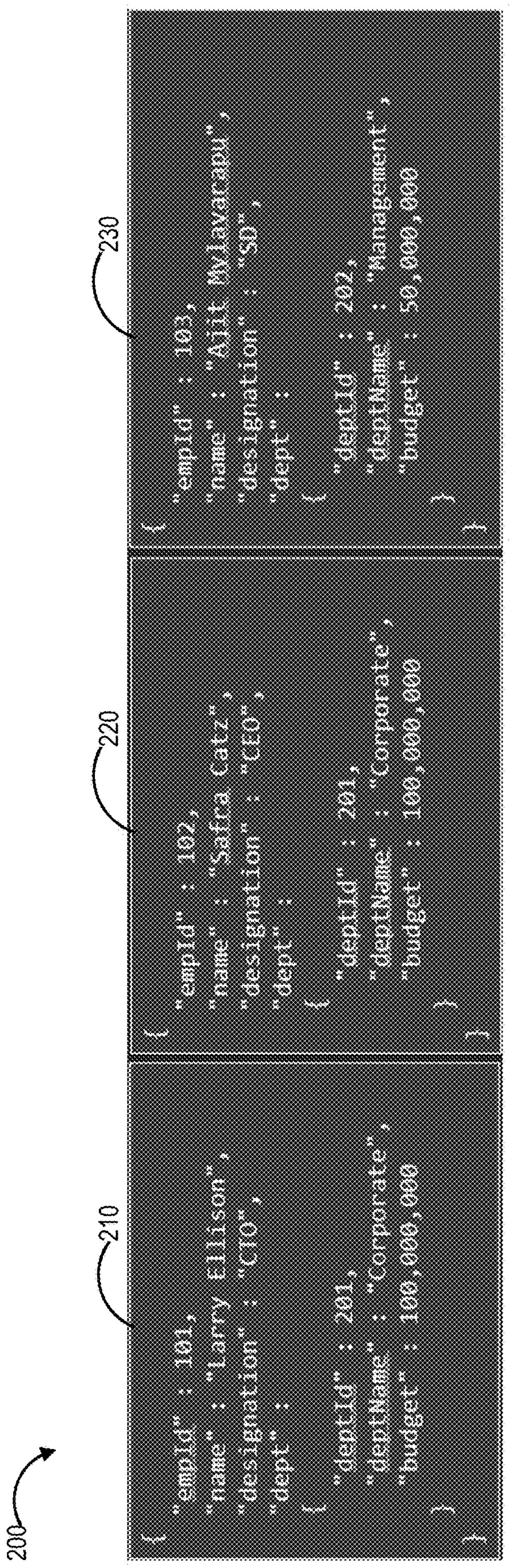
FIG. 2 is a diagram that depicts an example departments collection, comprising multiple documents pertaining to different departments.

FIG. 2 is a diagram that depicts an example departments collection 200, comprising multiple documents 210-230 pertaining to different departments. The departments collection may be stored in a single file or different files, one file for each department document. In this example collection, three departments are identified and data about each of the three departments is included. For example, each department document includes data about two employees.

Figure 3:
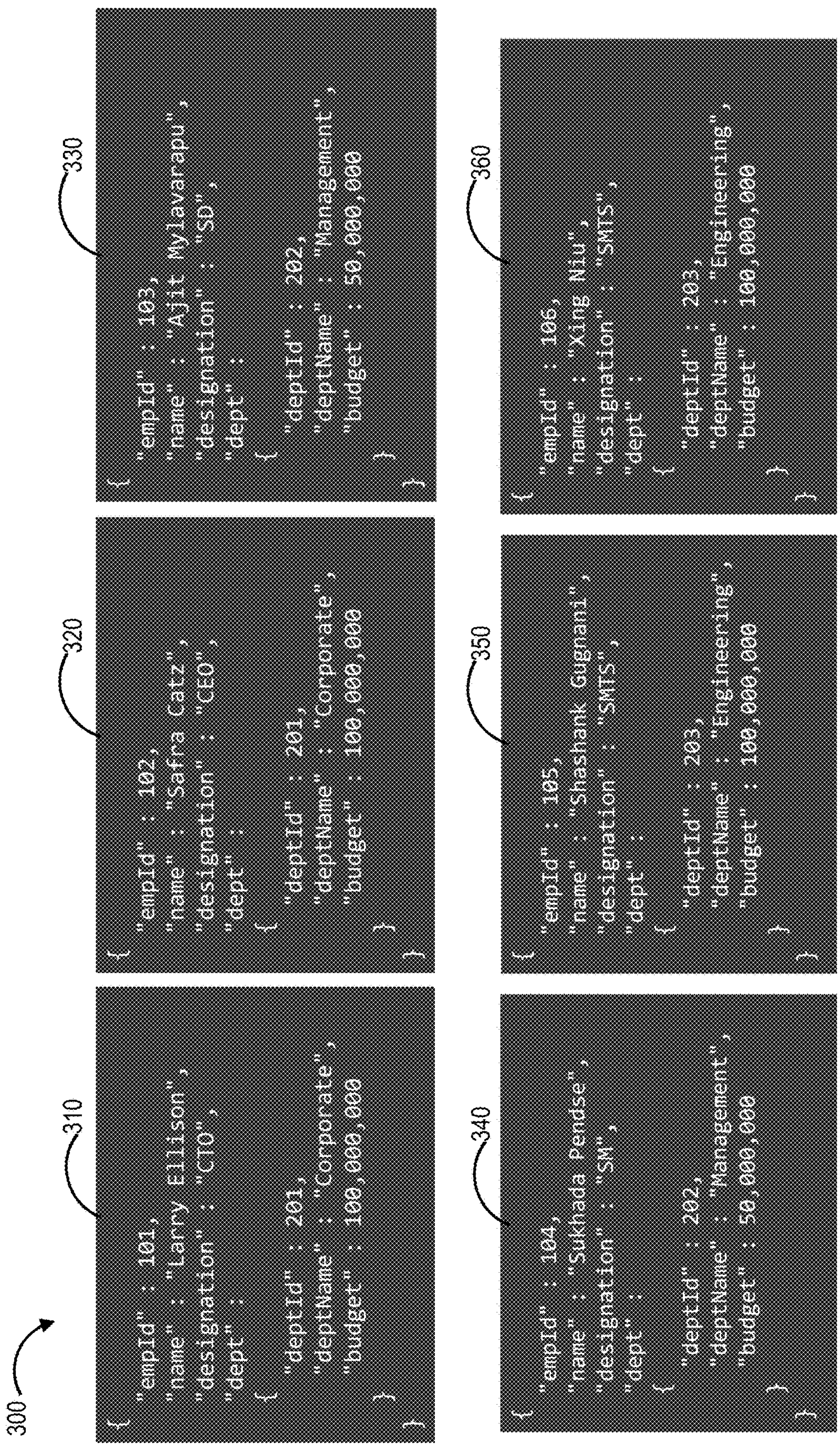
FIG. 3 is a diagram that depicts an example employees collection, comprising multiple documents pertaining to different employees.

FIG. 3 is a diagram that depicts an example employees collection 300, comprising multiple documents 310-360 pertaining to different employees. The employees collection may be stored in a single file or different files, one file for each employee document. In this example collection, six employees are identified and data about each of the six employees is included. For example, each employee has an identifier, a name, a designation, and a department.

Schema Validation

Validator 122 performs schema validation on each document collection. A schema is the organization or structure for data in a database. A schema indicates (1) relationships between objects and between objects and fields, (2) object names and field names, and (3) field types. For example, an object has a name and one or more fields, each of which has a name and a field type. An object may be a parent object, a child object, or both. A parent object is an object with one or more child objects. A child object is an object with a parent object. An object may be both a parent object (of one object) and a child object (of another object). A parent object may be a root object, which means the parent object is not a child object of any other object. A child object may be a leaf object, meaning that the child object is not a parent object of any other object. Examples of types of fields (or field types) include number, date, and string.

Validator 122 determines whether the schema of a document collection is consistent. In other words, validator 122 determines whether there is a global schema that all documents in a collection satisfy. For example, a document collection that will pass the validation phase should not have an employee document as well as a department document.

Given a collection of documents, the following conditions should be satisfied: (1) a sufficient number of documents in the collection satisfy a global schema (there is at least one low entropy field, as described herein); and (2) there is sufficient overlap between the fields of the documents in the collection. If at least one of these conditions fails, then a global schema for documents in the collection does not exist and validation fails. For example, a first employee document includes a field named "designation" while a second employee document does not include the field "designation." Continuing with this example, the second employee document includes a department name field while the first employee document does not include the field "department name." In addition, both employee documents include an employee identifier, a name, and a department identifier. Thus, there exists a global schema that satisfies all documents in the collection and there is overlap between the fields of the documents in the collection.

The following is pseudocode for generating a global schema for a document collection:

```
INIT global_schema to NULL
# Build a schema for the collection
FOR each document in the collection
  FOR each field in the document
    IF field is in NOT in global_schema //checks whether the complete path (with any
                                        // type) already exists in the global schema
      ADD <path, type> to global_schema
    ELSE
      ADD type to list of types for the field
    ENDIF
  ENDFOR
ENDFOR
# Prune the global_schema to build the final global schema
FOR each field in the global_schema
  REMOVE field if it appeared in a small % of docs
  REMOVE field if it has more than one type with >5% frequency
  KEEP the field type with highest frequency
ENDFOR
```

Examples of paths in an employee document include "/", "/empId", and "/dept/deptId". Thus, a path may include a root designation (e.g., "/") and a series of one or more field names separated by a "/". Examples of field types include Number, Date, String, and Object, which is a type of field that includes one or more other fields.

Figure 4:
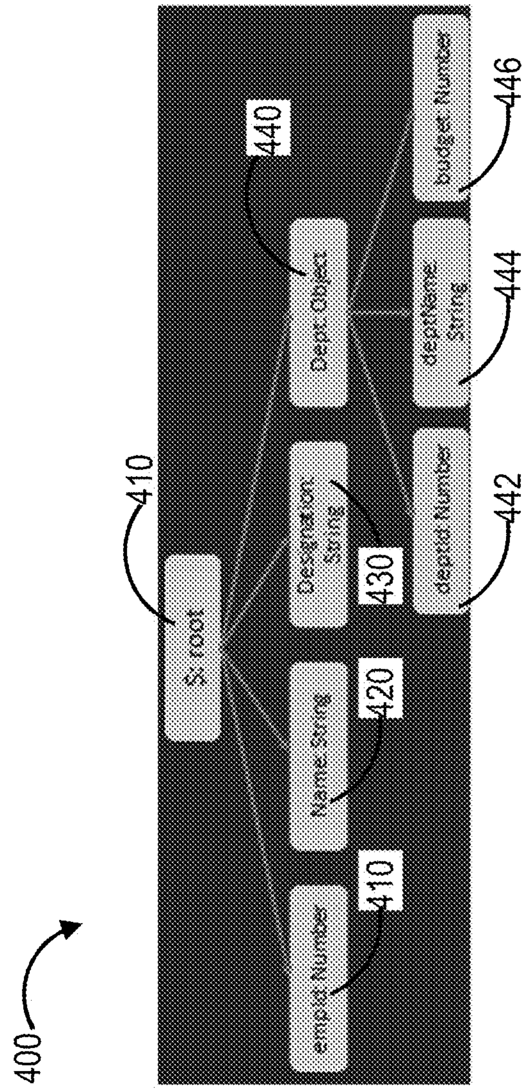
FIG. 4 is an example of a global schema that a validator generates based on the employees collection, in an embodiment.

FIG. 4 is an example of a global schema 400 that validator 122 generates, based on an employees collection, using instructions that are based on the above pseudocode, in an embodiment. Global schema 400 indicates the structure (e.g., relationships between fields) and the data types of each field. If not explicit in the documents, the data types of entities in a document may be inferred, such as determining whether a value is a Number, Date, Timestamp, Interval, Variable Character, String. However, the data that is used to visualize global schema 400 in FIG. 4 may just be a group of <path, type> tuples. Also, each <path, type> tuple may be associated with a frequency value that indicates a number of times that tuple appears in a document collection.

Global schema 400 includes a root node 410 representing an employee document, four child nodes 410-440 (three of which are child attribute nodes that correspond to non-object fields of an employee document, and one of which is a child object node that corresponds to an object field of an employee document), and three grandchild nodes 442-446, or child nodes of the child object node 440.

In the above example pseudocode, fields that have high entropy are removed. High entropy fields cannot be normalized to relational columns. A field has (or is) high entropy if the field appears in a small percentage of documents (e.g., less than 10%) or if the field has been associated with multiple types, each of which occurs greater than a certain frequency. For example, if a field name is associated with a string type in 80% of all instances of that field name in a document collection and is associated with a number type in the other 20% of all those instances, then the field name is removed from consideration and therefore, will not be a field or column in any resulting relational schema.

There are at least two options to process fields with high entropy: (a) report documents containing such fields to a user or administrator (and, optionally, validate the remaining documents); or (b) place all such fields in a flex JSON column (via flex field support). The following pseudocode describes a variation of option (a):

```
INIT reject_count to 0
FOR each document in the collection
  IF json_schema(document) does NOT match global_schema
    RECORD document in error_log
    reject_count++
    IF reject_count > config.rejectLimit
      FAIL validation
    ENDIF
  ENDIF
ENDFOR
```

Thus, if a document from the documents collection (that was used to generate the global schema) does not match the global schema ("global_schema") that validator 122 constructed, then the reject count (which is initialized to zero) increments by one. If the reject count exceeds a rejection limit, then validation fails and the normalization and schema generation steps are skipped. A document does not match a global schema if the document contains at least one field that is not found in the global schema. For example, if the field designation was removed due to high entropy (e.g., the field was associated with a different data type over 5% of the time) and a document contains the field designation, then the reject count increments by one.

In the example pseudocode above where validation may fail, any documents that fail are stored in an error log. In this option, a user or system administrator may view the error log and determine whether to modify the global schema or the document in order for the document to match.

In option (b) the validation step does not need to be executed. Instead, ingestion of high entropy fields is supported using flex field support, where a 'flex' JSON column is added at each level that contains such high entropy fields, and these fields are automatically embedded inside the 'flex' JSON column. The following is an example create table statement where a "Flex" JSON column is added to support and store high entropy fields:

```
CREATE TABLE author
(
  id          number,
  first       varchar(128),
  last        varchar(128),
  extras      JSON (object),
  constraint pk1 primary key (id)
);
```

The following is an example create duality view statement where a "Flex" JSON column is added to support and store high entropy fields:

```
CREATE JSON Duality View authorV as author @insert @update @delete
{
  _id                      : id,
  firstName                : first,
  lastName                 : last,
  extras                   @flex
}
```

Normalization

After a document collection is validated, normalizer 124 normalizes the data in the document collection in order to prepare the data for relational consumption, or storage. Normalization generally involves de-duplication of data across fields and identifying non-overlapping entities and the relationships between them. The output of this process is a set of normalized entities, the relationships between them, and a mapping of document fields to relational fields.

More specifically, normalization involves using the structure of the input document collections as a guide to identify entities to be normalized. Each node in the global schema that has non-null children becomes a candidate for normalization. All such nodes are added to a normalization set. Then, for each node in this normalization set, the primary key (PK) for the node is identified. If no PK can be found, then an auto-generated identity PK column may be added to the node. Then, for each pair of nodes in the normalization set, it is determined whether the nodes represent the same entity. If so, then the pair of nodes are combined into a single super-node.

Based on these steps, normalization comprises six phases: building a schema tree for each document collection, identifying candidate nodes for normalization (where the hierarchy information is used to identify which fields should be grouped together in a single entity), identifying the PK for each candidate entity or node, normalizing the candidate entities, identifying foreign key (FK) references between entities, and constructing an entity-relationship (ER) model and mapping between document fields and entity attributes. These six phases are described in more detail herein.

Normalization Phase 1: Building a Schema Tree

Figure 5:
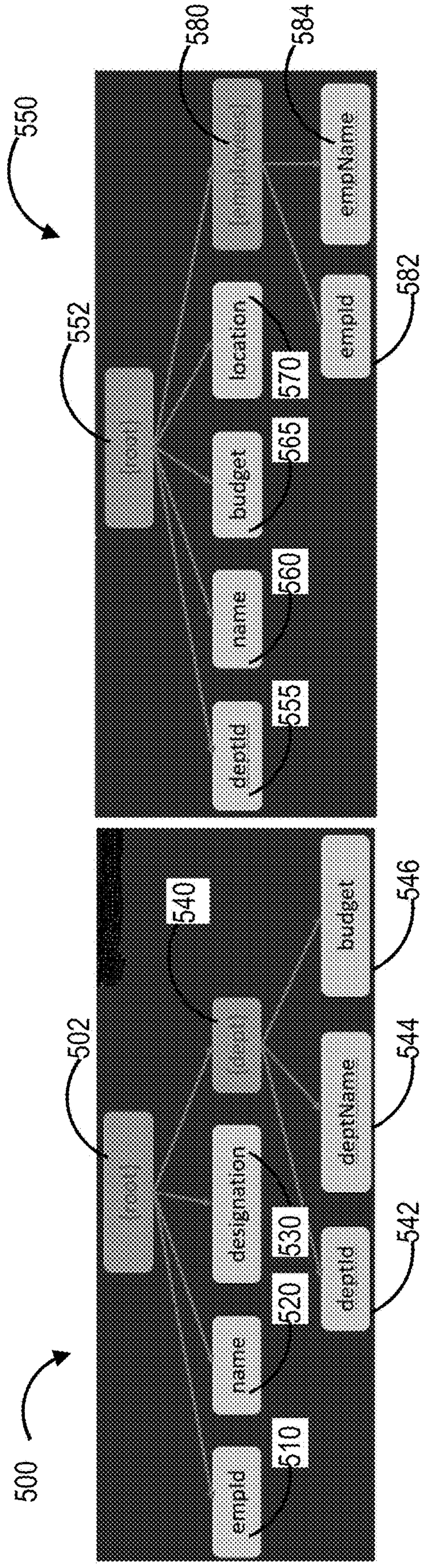
FIG. 5 is a block diagram that depicts two example schema trees, one for each document collection, in an embodiment.

FIG. 5 is a block diagram that depicts two example schema trees 500 and 550, one for each document collection, in an embodiment. Schema trees 500 and 550 may be generated using the process described herein by validator 122.

Employee schema tree 500 comprises a root node 502, three child attribute nodes 510-530 (each of which corresponds to a field of an employee object), and a child object node 540 (which corresponds to a department object), which comprises three child attribute nodes 542-546 (each of which corresponds to a field of the department object). Child object node 540 is a singleton descendant, meaning that if a department object is a child of an employee node, then there is only one department object.

Department schema tree 550 comprises a root node 552, four child attribute nodes 560-575 (each of which corresponds to a field of a department object), and a child object node 580 (which corresponds to one or more employee objects), which child object node 580 comprises two child attribute nodes 582-584 (each of which corresponds to a field of the employee object). Child object node 580 is an array descendant, meaning that if an employee object is a child of a department node, then there may be multiple employee objects.

Normalization Phase 2: Identifying Candidate Nodes for Normalization

Given schema trees 500 and 550, candidate nodes for normalization are identified. A candidate node is each parent node, which is associated with one or more child nodes, that has non-null children. Therefore, in schema trees 500 and 550, each of nodes 502, 540, 552 and 580 is a candidate node because each of those nodes is a parent node.

In some scenarios, a document or entity might contain unnested attributes from another document or entity. For example, an employee entity or document contains a department identifier, a department name, and a department budget, all at the same level as an employee identifier and an employee name.

To handle this unnested attribute scenario, a functional dependency tree is generated (up to a depth of 2) within a sub-object where the root is a primary key (PK). A functional dependency between two attributes (or fields) means that given the value of one attribute, it is possible to accurately determine the value of the other attribute. Based on this automatic analysis given the example above, a functional dependency tree (FDT) may be generated where the root of the FDT is employee identifier (i.e., the PK), department identifier is a child attribute of the root, and department name and budget are child attributes of department identifier.

Next, each sub-tree (at depth 1) can be considered to be an unnested entity if and only if (1) the difference in cardinality (or number of unique values) between the root and the sub-tree is greater than a certain threshold (e.g., at least 2×) and (2) the sub-tree has at least one field at depth 2 (relative to the root in the FDT). For example, if there are at least two employees in each department (as indicated in the employee documents), then (1) is satisfied. In other words, there will probably be many more unique employee identifiers than unique department identifiers. On the other hand, if there is a closer to a one-to-one relationship between employee identifier and department identifier, then it does not make sense to create another table to store the department data, which would be duplicative of the department data in an employee document/record.

In some scenarios, a document or entity might contain nested attributes in the same entity. For example, an employee entity or document contains a name entity that is itself an object that contains a first name field and a last name field. In such scenarios, it would be beneficial to treat a nested entity as a set of nested attributes of the parent entity instead of creating a separate relational table for the nested entity. Such treatment would involve removing the nested entity and including the attributes of that nested entity as direct child entities of the parent entity. Such "unnesting" is performed if (a) the nested entity does not have a primary key (PK) or (b) the cardinality difference between the parent and nested entity is less than a particular threshold (e.g., 2).

Normalization Phase 3: Identifying PK for Each Candidate Node

In phase 3, a primary key is identified for each candidate node. In order to do this, for each candidate node, all ordered pairs of attributes of the candidate node are considered and it is determined whether a functional dependency exists between each pair. A functional dependency exists between attribute a1 and attribute a2 if the "strength" of the dependency between the two attributes is greater than a particular threshold α. For example, strength(a1, a2)>α, where strength( ) is a function that measures dependency and α is the particular threshold, such as 0.99. An example of the strength function is the following:

strength(a1, a2)=(# of unique values of a1)/(# of unique (a1, a2) value pairs)

This functional dependency check does not work if an input collection uses composite keys. To solve this scenario of composite keys, groups of two attributes (or even more) as candidate PKs may be considered if no single attribute is a PK.

A PK attribute is the attribute that has functional dependencies to all other attributes of a candidate node. If no such attribute exists, then the candidate node does not have a PK and cannot be normalized to a separate entity. In this case, this candidate node may be considered a nested attribute set of the parent entity. On the other hand, if multiple attributes satisfy the PK definition, then the following rules may be used to break ties:

a. Prefer attributes with higher strength values b. Prefer attributes with higher entropy values (the more unique an attribute is, the higher the attribute's entropy value); PK fields should have high entropy because it is expected to have mostly unique values (a PK field might not have all unique values because of noise in the data or duplicate data; for example, several employees may belong to the same department, resulting in department information being duplicated across employee documents. Consequently, not all department ID values across employee documents will be unique)

c. Prefer attributes with lower variance (e.g., a price of a stock may be unique across many stock objects but the price is likely to have a large variance, unlike employee identifiers; variance may be variance in the number of bytes to store the attribute value)

d. Prefer attributes with names ending in id, Id, or ID

If multiple attributes are PK candidates, then one is selected as the PK for the entity in question and the remaining may be identified as unique keys (UKs)

Given node 502 in FIG. 5, the following table lists a strength measure of each pair of attributes of node 502:

TABLE A

| Attribute Pair | Strength |
|---|---|
| <empId, name> | 1 |
| <empId, designation> | 1 |
| <name, designation> | 1 |
| <name, empId> | 1 |
| <designation, name> | 0.66 |
| <designation, empId> | 0.66 |

Based on Table A, attributes "empId" and "name" have functional dependencies to all other attributes of node 502 and both attributes satisfy the conditions to be a PK. A tie between "empId" and "name" is broken using rule 3 (prefer attributes with lower variance of the respective values), resulting in selecting "empId" as the PK.

Using this process of PK identification, in light of FIG. 5, the following PKs are identified for the candidate nodes in FIG. 5:

TABLE B

| Node | PK |
|---|---|
| Node 502 | empId |
| Node 540 | deptId |
| Node 552 | deptId |
| Node 580 | empId |

Normalization Phase 4: Normalizing Candidate Entities

Once PKs are identified for candidate nodes, the candidate entities are normalized. Two nodes, N1 and N2, may be normalized into a single node (or entity) if there is a one-to-one relationship between at least one pair of attributes of N1 and N2. Generally, a join of N1 and N2 is performed based on an equality on their PKs (or UKs). If a one-to-one correspondence between the attributes in the join result is determined, then N1 and N2 may be grouped into a single relation.

For example, the following is one way in which node 502 (referenced as node1 in Table C) and node 580 (referenced as node4 in Table C) may be normalized into a single entity. First, a join of node1 and node4 is performed based on an equality on their PKs, i.e., node1.empId=node4.empId.

TABLE C

| Node1.empId | Node1.name | Node1.designation | Node4.empId | Node4.empName |
|---|---|---|---|---|
| 101 | Larry Ellison | CTO | 101 | Larry Ellison |
| 102 | Safra Catz | CEO | 102 | Safra Catz |
| 103 | Ajit Mylavarapu | SD | 103 | Ajit Mylavarapu |
| 104 | Sukhada Pendse | SM | 104 | Sukhada Pendse |
| 105 | Shashank Gugnani | SMTS | 105 | Shashank Gugnani |
| 106 | Xing Niu | SMTS | 106 | Xing Niu |

The number of rows in the join result should be at least (1−alpha) % the size of the number of data points in the larger of the two nodes. Alpha may be a high value, such as 0.99. Also, the size of the join result should be a significant percentage (e.g., >98%) of the size of the data contained in the smaller of the two nodes. The size of the data contained in a node is the number of data points in the node. For example, for the employee node, the size would be the number of employee objects. This latter condition eliminates matches that result from extremely small, coincidental overlaps in the domains of the subtrees' parent attributes.

After the join result is generated, a matrix (attrMatrix) is constructed that has one cell per pair of attributes from each node. Such constructing is performed by iterating over every row (R) in the join result and increment attrMatrix[a1][a2] by 1 if R[a1]=R[a2]. This matrix is presented as Table D.

TABLE D

| Attributes | node4.empId | node4.empName |
|---|---|---|
| node1.empId | 6 | 0 |
| node1.name | 0 | 6 |
| node1.designation | 0 | 0 |

After the attrMatrix is constructed, a mapping between node1 and node4 is determined, such that $$\{(attrMatrix[a1][a2])/(\#\text{records in join set})\} \geq \alpha^2$$

where a1 is an attribute in node1 and a2 is an attribute in node4 and α is threshold (e.g., 0.99), and $$attrMatrix[a1][a2] \geq attrMatrix[a1][a2']$$

for all other attributes a2' in node4. This latter condition makes sure that the a2 that was identified has a higher value than other attributes in the same node.

Based on attrMatrix, a one-to-one mapping between node1 and node4 may be constructed where node1.empId maps to node4.empId and node1.name maps to node4.empname, but node1.designation does not map to any attribute in node4. This mapping is shown in FIG. 6.

Figure 6:
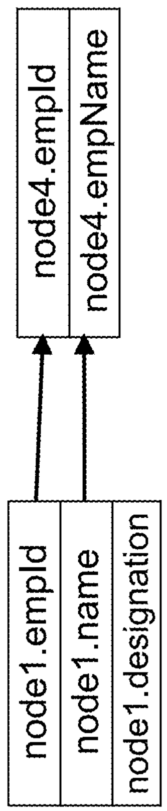
FIG. 6 is a block diagram that depicts a mapping between attributes of two nodes from a schema tree, in an embodiment.
Figure 7:
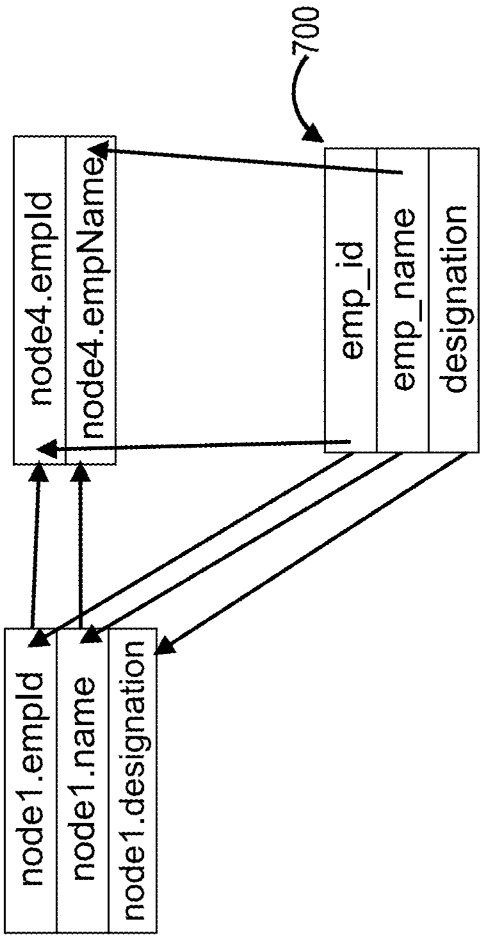
FIG. 7 is a block diagram that depicts an example normalized entity based on the mapping, in an embodiment.

Based on the mapping indicated in FIG. 6, node1 and node4 (corresponding to nodes 502 and 580) may be normalized into a single entity, as indicated in entity 700 depicted in FIG. 7. Entity 700 comprises three attributes, which correspond to the three attributes of node1 and the two attributes of node4.

Figure 8:
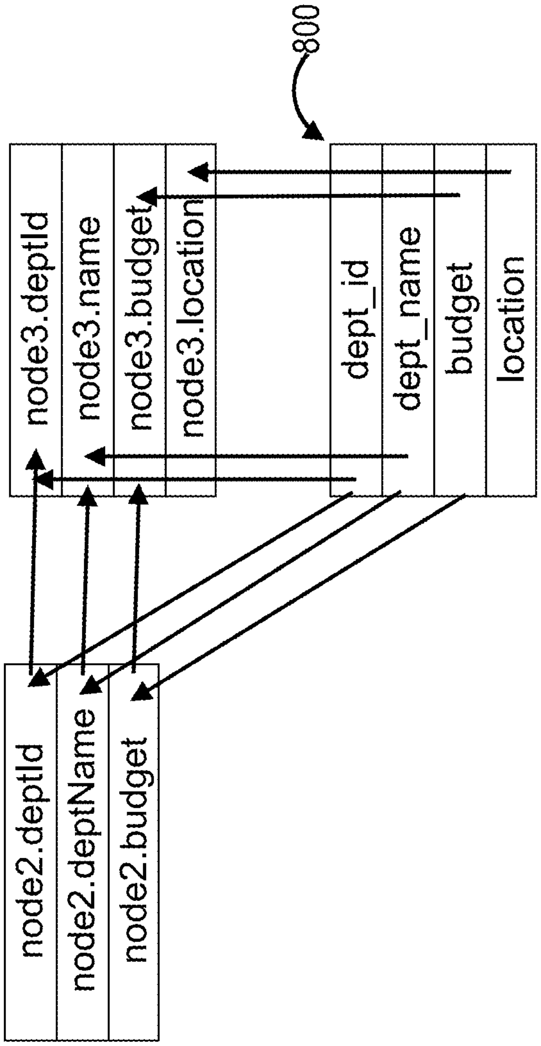
FIG. 8 is a block diagram that depicts another example normalized entity based on another documents collection, in an embodiment.

Similarly, node2 and node3 (corresponding to nodes 540 and 552) may be normalized into a single entity, as indicated in entity 800 depicted in FIG. 8. Entity 800 comprises four attributes, which correspond to the three attributes of node2 and the four attributes of node3.

Normalization Phase 5: Identifying FK References between Entities

After two or more entities are normalized, relationships between the normalized entities are considered in the (JSON) schemas. For one-to-many relationships, the PK of the parent entity is added as a FK in the child entity. For one-to-one relationships, the PK of the child entity is added as a FK in the parent entity. For many-to-many relationships, a mapping table may be created with two columns: the PK of the parent entity is added as a FK in the child entity and the PK of the child entity as added as another FK. The combination of the two FKs may be marked as the PK of the mapping table.

Figure 9:
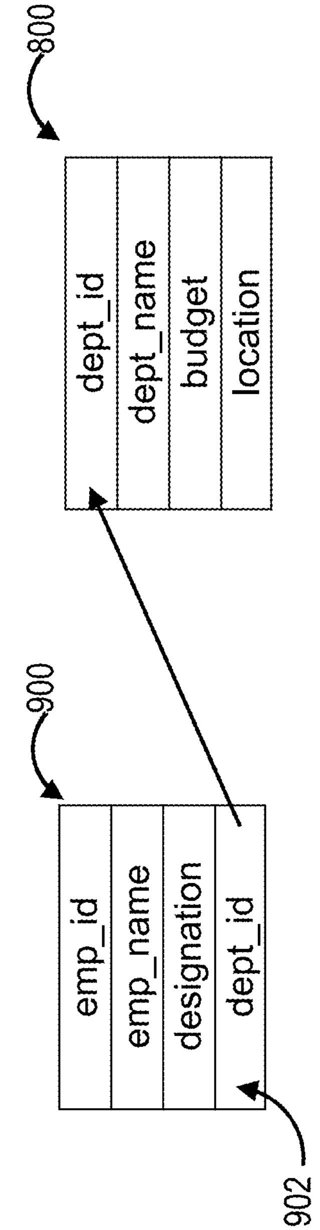
FIG. 9 is a block diagram that depicts a foreign key relationship between the two normalized entities, in an embodiment.

In the example normalized entities of FIGS. 7 and 8, there is a one-to-many relationship between the department entity and the employee entity. The type of relationship (whether one-to-many or one-to-one) can be determined by analyzing one or more documents in one or more of the document collections and determining that a department document includes an array of employee objects rather than a single employee object. Therefore, normalizer 124 adds (as indicated in FIG. 9) the PK of the department entity 800 as an FK 902 in employee entity 900 (which corresponds to entity 700, except entity 900 includes an attribute for department identifier that identifies a department to which the employee belongs). In a one-to-one relationship, the parent entity may be determined based on the hierarchy of the entities in the document (e.g., JSON) collections. For example, in the employees collection, the employee entity is the parent and the department entity is the child because department is a child object of the employee root object in the JSON input.

Normalization Phase 6: Constructing an ER Model

Figure 10:
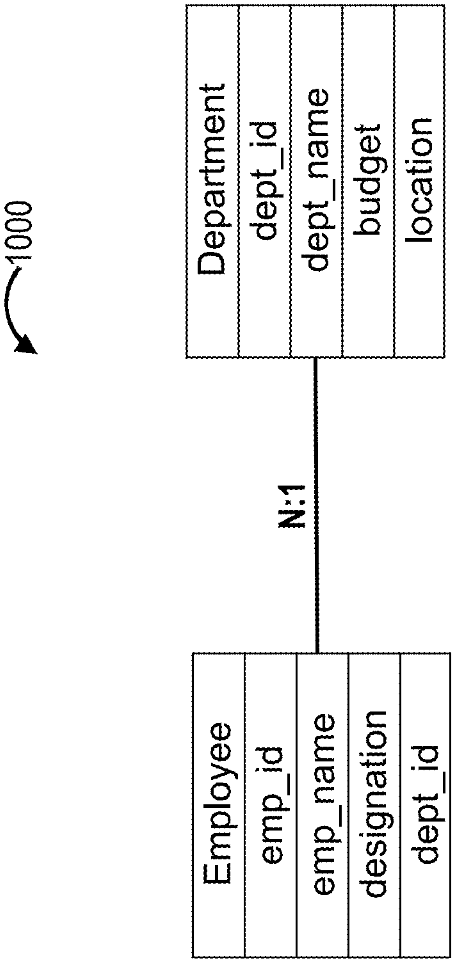
FIG. 10 is a block diagram that depicts an entity-relationship (ER) model that is based on the two normalized entities, in an embodiment.

In phase 6 of the normalization process, normalizer 124 constructs an entity-relationship (ER) model and mapping between document fields and entity attributes. Based on the JSON schema for each collection and the normalized entities, normalizer 124 builds ER model 1000, as depicted in FIG. 10. Also, normalizer 124 constructs the following mapping table (Table E) between document fields and table columns.

TABLE E

| Document Field | Table Column |
|---|---|
| emp.empId, dept.employees.empId | employee.emp_id |
| emp.name, dept.employees.name | employee.emp_name |
| emp.designation | employee.designation |
| emp.dept.deptId, dept.deptId | department.dept_id |
| emp.dept.deptName, dept.deptName | department.dept_name |
| dept.budget | department.budget |
| dept.location | department.location |

Schema Generation

Schema generator 126 generates, based on validated schemas and normalized entities, a recommendation of a table creation statement and/or a duality view creation statement. In a related embodiment, a user (e.g., a database administrator) overrides one or more recommendations. Alternatively, no user intervention is required.

Either way, schema generator 126 automatically generates one or more tables and/or duality views, for example, by executing a create table statement and/or a create duality view statement. After these relational database objects are generated, a database application seamlessly migrates to a relational database system (e.g., RDB system 130).

In an embodiment, users of DDB system 120 are able to run their existing applications without significant changes (or no changes) on top of these automatically-generated duality views.

The following is pseudocode for generating a create table statement in Structured Query Language (SQL), which statement is a type of data definition language (DDL) statement. Embodiments are not limited to SQL and may be applicable to any database query language.

```
FUNCTION GENERATE_TABLE_DDL(SCHEMA_NODE)
  PRINT ‘CREATE TABLE’, SCHEMA_NODE.table_name, ‘(’
  FOR COLUMN in SCHEMA_NODE.column_list
    PRINT COLUMN.name, ‘ ’, COLUMN.type
    IF (COLUMN.isPk)
      PRINT ‘ PRIMARY KEY’
    ENDIF
    PRINT ‘,’//except for last column
  ENDFOR
  FOR FK in SCHEMA_NODE.fk_list
    PRINT‘, CONSTRAINT’, FK.name, ‘FOREIGN KEY’
    PRINT ‘(’, FK.column_name, ‘)’
    PRINT ‘ REFERENCES ’, FK.target
    PRINT ‘(’, FK.target_column_name, ‘)’
  ENDFOR
  PRINT ‘);’
ENDFUNCTION
```

A schema_node is an object that contains data about a node in one of the schema trees that was generated. A schema_node has a type, such as a root node, a parent node, a child node, or a field. If a root node, then the schema_node indicates a table name and key data, such as which field is a private key or foreign key. If the schema_node is a node with fields, then the schema_node will indicate the names of the fields.

Given the normalized employee entity described herein as input, the above pseudocode would generate the following DDL statement:

```
CREATE TABLE employee
  (
    emp_id number PRIMARY KEY,
    name varchar2(50),
    designation varchar2(50),
    dept_id number,
    CONSTRAINT emp_fk FOREIGN KEY(dept_id)
      references department(dept_id)
  );
```

Additionally, the same pseudocode, given the normalized department entity described herein as input, would generate the following DDL statement:

```
CREATE TABLE department
(
  dept_id number PRIMARY KEY,
  name varchar2(50),
  budget number,
  location varchar2(100)
);
```

The following is pseudocode for generating a create index statement in SQL in order to generate an index on foreign keys:

```
FUNCTION GENERATE_INDEX_DDL(SCHEMA_NODE)
  FOR FK in SCHEMA_NODE.fk_list
    PRINT 'CREATE INDEX ', FK.name, '_index '
    PRINT 'ON ', SCHEMA_NODE.table_name
    PRINT '(', FK.column_name, ')'
  ENDFOR
ENDFUNCTION
```

Given the normalized employee entity described herein as input, the above pseudocode would generate the following DDL statement (since the normalized employee entity has a foreign key, but not the normalized department entity):

CREATE INDEX emp_fk_index on employee (dept_id);

The following is pseudocode for generating a create duality view statement in SQL:

```
FUNCTION GENERATE_VIEW_DDL(SCHEMA_NODE)
  PRINT 'CREATE JSON RELATIONAL DUALITY VIEW '
  PRINT SCHEMA_NODE.collection_name
  PRINT ' AS '
  CALL UNPARSE_NODE(SCHEMA_NODE)
  PRINT ';'
ENDFUNCTION
FUNCTION UNPARSE_NODE(SCHEMA_NODE)
  SWITCH (SCHEMA_NODE.type)
  CASE NODE:
    PRINT SCHEMA_NODE.alias_name, ':'
  CASE ROOT:
    PRINT SCHEMA_NODE.table_name, ' { '
    FOR child in SCHEMA_NODE.children
```

-continued

```
      CALL UNPARSE_NODE(child)
      PRINT ', ' // except for last child
    ENDFOR
    PRINT ' } '
    BREAK
  CASE FIELD:
    PRINT SCHEMA_NODE.alias_name, ' : '
    PRINT SCHEMA_NODE.column_name
    BREAK
  ENDSWITCH
ENDFUNCTION
```

Duality views allow documents to be stored in a relational format, but accessed by applications in their native format (e.g., JSON). In this way, applications that accessed the documents in their native format may continue doing so even though the documents are actually stored in a relational format. With duality views, the documents that the applications present to a user will look the same as the documents that were sent to ADM system 120 from DDB system 110. Given the normalized employee entity described herein as input, the above pseudocode would generate the following DDL statement:

```
CREATE OR REPLACE JSON DUALITY VIEW
  employee_dv AS employee
  {
    empId: emp_id
    name: name
    designation: designation
    dept: department
    {
      deptId: dept_id
      deptName: name
      budget: budget
    }
  };
```

The data on the left side of the colon is a field name in the original document while the data on the right side of the colon is a corresponding field name in a relational table, such as a column name or a table name.

Additionally, the same pseudocode, given the normalized department entity described herein as input, would generate the following DDL statement:

```
CREATE OR REPLACE JSON DUALITY VIEW
  department_dv AS department
  {
    deptId: dept_id
    name: name
    budget: budget
    location: location
    employees: employee
    [{
      empId: emp_id
      empName: name
    }]
  };
```

Application Interface

Documents from DDB system 110 may be imported into RDB system 130 may be performed in one or more ways. For example, one or more document (e.g., JSON) collections are imported into a set of tables with a single (e.g., JSON) column using a export API (e.g., "mongoexport") that specifies a collection and, optionally a set of documents and an import API (e.g., mongoimport") that specifies a document database, user credentials and the collection/documents to export.

Once the document collections are stored in a single JSON column of a table in RDB system 130, a set of functions is executed in order to determine a relational schema for the input collections. The set of functions may be part of a PL/SQL package. Two or more functions may be used to validate, normalize, and generate table schema. Alternatively, a single function may be used to perform each of these main operations. An advantage of having two or more functions is that a user/administrator would be allowed to view an ER model that is output from the validate and normalize function(s) and modify the ER model. For example, the user may add or remove fields, add or remove FKs, add or modify relationships, etc. The user may then specify the modified ER model as input to another function (e.g., a generate schema function), which will automatically generate and execute DDL statements that are based on the modified ER model.

After the schema is generated, the document data from the single (e.g., JSON) column is moved to one or more duality views. For example, employee and department documents are moved from a single JSON column to multiple duality views. This may be performed using an "insert as select" statement for each document collection.

Example usage of an application interface is the following code:

```
DECLARE
  schema varchar2(32767);
 BEGIN
  schema :=
  dbms__json__duality.infer__and__generate__schema(json__object('collectionNames':
    ['emp', 'dept']));
  execute immediate schema;
 END;
```

In a related embodiment, a graphical user interface (GUI) presents a button or other selectable graphical element that, when selected, performs the operations described herein. In this way, a user is not required to specify any code. Instead, the user may only be required to (1) specify a location where one or more document collections are stored and a target database in which to store the one or more document collections and (2) select a graphical button.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
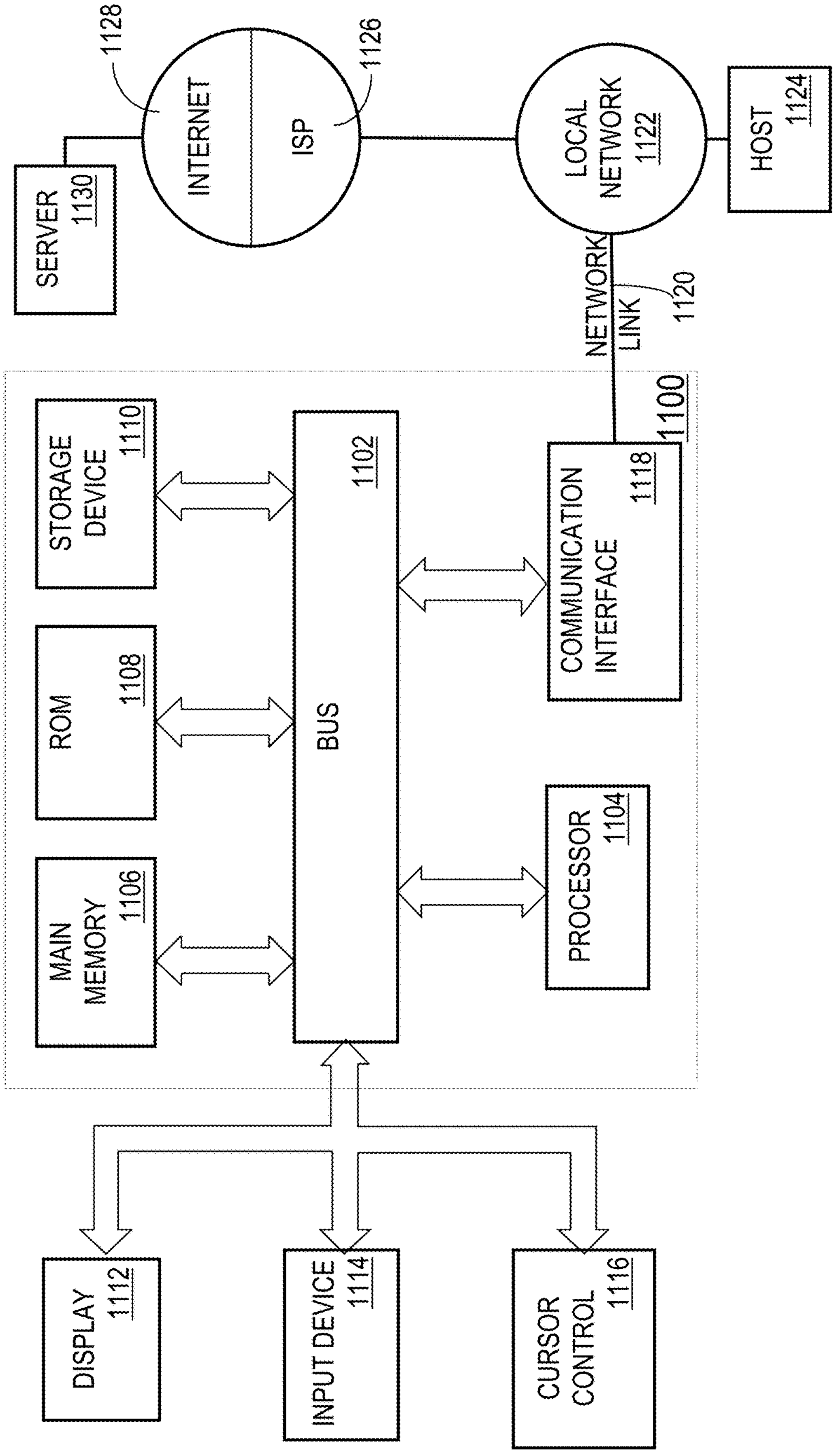
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

Figure 12:
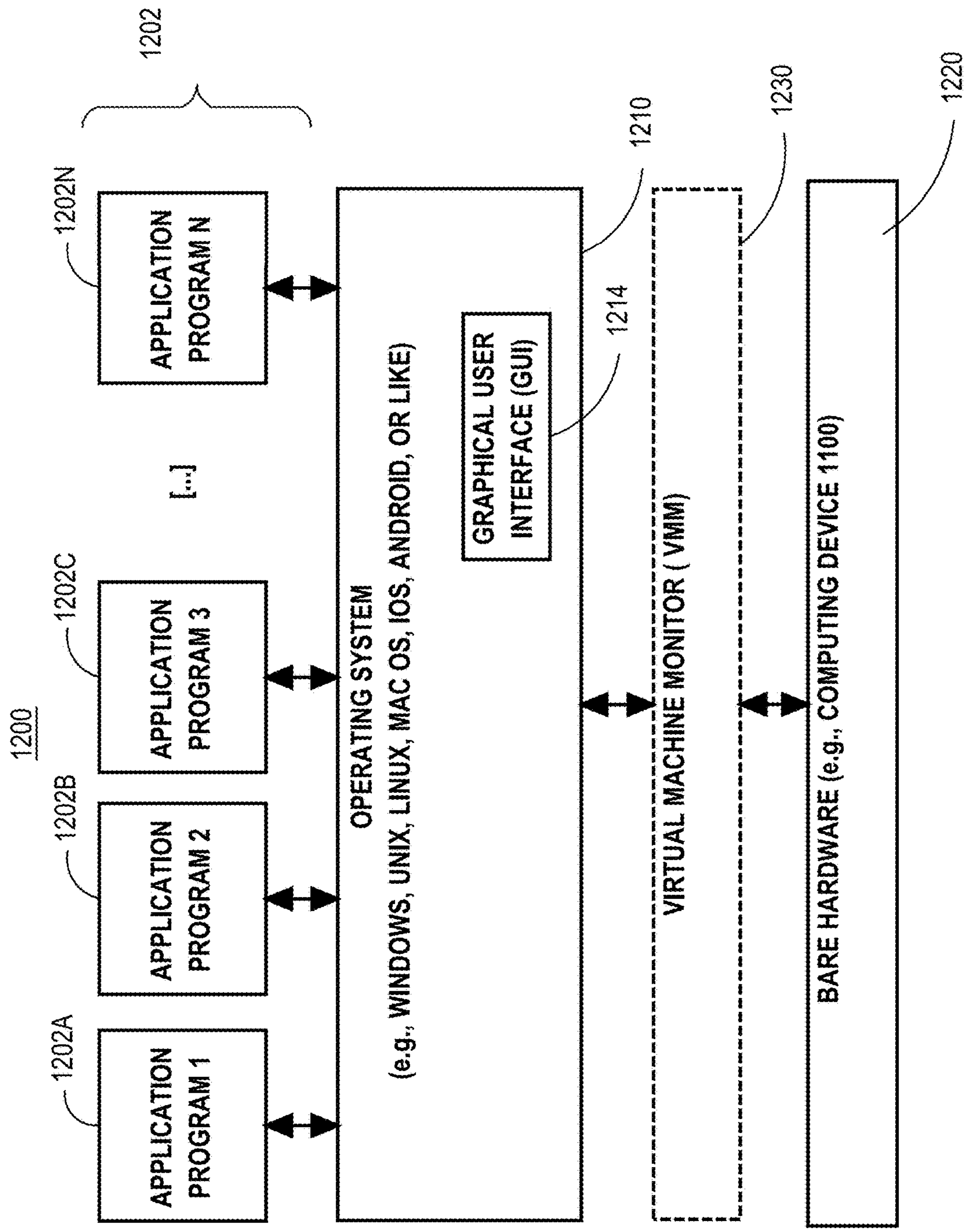
FIG. 12 is a block diagram of a basic software system that may be employed for controlling the operation of the computer system, in an embodiment.

FIG. 12 is a block diagram of a basic software system 1200 that may be employed for controlling the operation of computer system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computer system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 500.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method for migrating documents from a document database system to a relational database system, the method comprising:

automatically determining, by one or more processors, whether a set of documents, from the document database system, can be stored in the relational database system;

in response to automatically determining that the set of documents can be stored in the relational database system, automatically identifying, by the one or more processors, based on a hierarchical structure of the set of documents, one or more entities to be normalized;

automatically generating, by the one or more processors, one or more database language scripts based on the one or more entities;

executing the one or more database language scripts to generate, in the relational database system, one or more data structures;

storing content from the set of documents in the one or more data structures, wherein the one or more data structures comprise one or more of a table, an index, or a duality view;

wherein the method is performed by one or more computing devices.

2. The method of claim 1, wherein determining whether the set of documents can be stored in the relational database system comprises:
  for each document in the set of documents:
    for each field in said each document:
      determining whether said each field is in a set of known fields;
      adding said each field to the set of known fields if it is determined that said each field is not in the set of known fields.

3. The method of claim 2, further comprising:
  determining whether a field in the set of known fields has a high entropy value;
  in response to determining that the field has a high entropy value, removing the field from the set of known fields.

4. The method of claim 3, wherein determining that the field has a high entropy value comprises:
  determining that the field is found in a certain percentage, of documents, that is lower than a first threshold percentage; or
  determining that the field is associated with two field types across the set of documents and that each of the two field types is associated with a percentage, of the documents in the set of documents, that is higher than a second threshold percentage.

5. The method of claim of 3, further comprising:
  adding the field to a flex JSON column in a table that stores data that originates in the set of documents.

6. The method of claim 2, further comprising:
  for each document in the set of documents:
    determining whether said each document matches the set of known fields;
      modifying a reject count in response to determining that said each document does not match the set of known fields;
  determining whether validation of the set of documents fails based on a value of the reject count.

7. The method of claim 1, further comprising:
  identifying, in a global schema for the set of documents, a plurality of entities that have non-null children as candidates for normalization.

8. The method of claim 7, further comprising:
  for each entity of the plurality of entities, identifying a primary key for said each entity.

9. The method of claim 8, wherein identifying the primary key for said each entity comprises:
  identifying a plurality of pairs of attributes of said each entity:
  for each pair in the plurality of pairs, determining whether a functional dependency exists between the attributes in said each pair.

10. The method of claim 9, further comprising:
  identifying a first attribute and a second attribute, in the attributes, as candidate private keys for a particular entity;
  applying one or more rules in a plurality of rules to select either the first attribute or the second attribute as a private key for the particular entity.

11. The method of claim 7, further comprising:
  for each pair of entities in the plurality of entities:
    determining whether said each pair of entities represents the same entity;
    combining said each pair of entities into a single entity if it is determined that said each pair of nodes represents the same entity.

12. The method of claim 11, wherein determining whether said each pair of entities represents the same entity comprises determining whether there is a one-to-one relationship between attributes of a first entity in said each pair of entities and attributes of a second entity in said each pair of entities.

13. The method of claim 7, further comprising:
  normalizing a first entity, of the plurality of entities, and a second entity of the plurality of entities;
  identifying a foreign key relationship between the first entity and the second entity.

14. The method of claim 7, further comprising:
  normalizing a first entity, of the plurality of entities, and a second entity of the plurality of entities;
  generating an entity-relationship (ER) model that comprises the first and second entities;
  generating a mapping between (1) attributes of the first and second entities and (2) table columns.

15. The method of claim 1, wherein the one or more database language scripts are a plurality of database language scripts, wherein executing the plurality of database language scripts comprises:
  executing a first script, of the plurality of database language scripts, which causes one or more tables to be generated;
  executing a second script, of the plurality of database language scripts, which causes one or more duality views to be generated.

16. A method for migrating documents from a document database system to a relational database system, the method comprising:
  storing a set of documents from a document database system;
  validating that the set of documents can be converted to one or more duality views;
  normalizing data of the set of documents for storing in a relational database system;
  generating a database language script that, when executed, generates the one or more duality views in the relational database system;
  executing the database language script to generate, in the relational database system, the one or more duality views;
  storing content from the set of documents in the one or more duality views;
  wherein the method is performed by one or more computing devices.

17. One or more non-transitory storage media storing instructions for migrating documents from a document database system to a relational database system, the method, wherein the instructions, when executed by one or more computing devices, cause:
  automatically determining, by the one or more processors whether a set of documents, from the document database system, can be stored in the relational database system;
  in response to automatically determining that the set of documents can be stored in the relational database system, automatically identifying, by the one or more processors, based on a hierarchical structure of the set of documents, one or more entities to be normalized;
  automatically generating, by the one or more processors, one or more database language scripts based on the one or more entities;
  executing the one or more database language scripts to generate, in the relational database system, one or more data structures;

storing content from the set of documents in the one or more data structures, wherein the one or more data structures comprise one or more of a table, an index, or a duality view.

18. The one or more storage media of claim 17, wherein determining whether the set of documents can be stored in the relational database system comprises:

for each document in the set of documents:

for each field in said each document:

determining whether said each field is in a set of known fields;

adding said each field to the set of known fields if it is determined that said each field is not in the set of known fields.

19. The one or more storage media of claim 17, wherein the instructions, when executed by the one or more computing devices, further cause:

determining whether a field in the set of known fields has a high entropy value;

in response to determining that the field has a high entropy value, removing the field from the set of known fields.

20. The one or more storage media of claim 17, wherein the instructions, when executed by the one or more computing devices, further cause:

identifying, in a global schema for the set of documents, a plurality of entities that have non-null children as candidates for normalization.

* * * * *